(12) United States Patent
Nishimura

(10) Patent No.: US 7,733,513 B2
(45) Date of Patent: Jun. 8, 2010

(54) IMAGE FORMING APPARATUS

(75) Inventor: Isao Nishimura, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1042 days.

(21) Appl. No.: 11/346,435

(22) Filed: Feb. 3, 2006

(65) Prior Publication Data

US 2006/0209336 A1 Sep. 21, 2006

(30) Foreign Application Priority Data

Mar. 15, 2005 (JP) ............................. 2005-073464

(51) Int. Cl.
*G06F 3/12* (2006.01)
*G06K 15/00* (2006.01)
(52) U.S. Cl. ...................... 358/1.15; 358/1.13; 358/1.6; 358/1.16
(58) Field of Classification Search .................. 358/1.1, 358/1.9, 1.13, 1.15, 1.14, 1.16, 1.17, 1.18, 358/474, 1.2, 505, 448, 468, 498, 1.6, 1.11, 358/1.3, 1.4, 1.5; 347/2, 3, 5, 14, 23; 399/1, 399/8; 382/312, 318
See application file for complete search history.

(56) References Cited

U.S. PATENT DOCUMENTS 7,123,390 B2 10/2006 Sato
2003/0142376 A1* 7/2003 Tabata et al. ................ 358/518

FOREIGN PATENT DOCUMENTS

| JP | 11-331493 | 11/1999 |
| JP | 2003-110807 | 4/2003 |
| JP | 2003-163792 | 6/2003 |
| JP | 2004-363714 | 12/2004 |

* cited by examiner

*Primary Examiner*—Dov Popovici
(74) *Attorney, Agent, or Firm*—Oblon, Spivak, McClelland, Maier & Neustadt, L.L.P.

(57) ABSTRACT

A first scanner unit and a second scanner unit simultaneously read the front surface and rear surface of a document, respectively, once stores the read image data in a first memory while adjusting the timing by a memory I/F, and then transfers the same to an ASIC. The image data is read out of the first memory and is inputted into an R channel and a B channel at an identical timing. The ASIC executes predetermined image processings and stores monochrome data on the front surface and rear surface of the document in a second memory through a PCI bus in parallel.

5 Claims, 7 Drawing Sheets

IMAGE FORMING APPARATUS

CROSS-REFERENCE TO RELATED APPLICATIONS

The present document incorporates by reference the entire contents of Japanese priority document, 2005-073464 filed in Japan on Mar. 15, 2005.

BACKGROUND OF THE INVENTION

1. Field of the Invention

The present invention relates to an image forming apparatus. More particularly the present invention relates to an image forming apparatus that includes both: a color image forming apparatus and an image forming apparatus that can simultaneously read both surfaces of a monochrome document.

2. Description of the Related Art

Some image forming apparatuses have a configuration for reading both surfaces of a document. Two configurations can realize this. First, provide a single scanner unit and pass the document under the scanner unit two times: once to read one surface and then to read the other surface. Second, provide two scanner units: one for reading one surface and another for reading the other surface.

Because the running cost of a color copier is still considerably high, there is a trend to put up with monochrome scanner.

Moreover, recently, a technique has been used to read a color document with a color scanner and send the read data to a personal computer (PC) or the like via a local area network (LAN) for outputting at the PC. Because, a configuration for forming images is not prepared in the color scanner, it is possible to lower the overall cost.

For example, in Japanese Published Unexamined Patent Application No. 2003-163792 discloses a conventional image forming apparatus. This image forming apparatus is provided with a color information reading sensor unit having laser diode (LD) light sources that emit lights with respective colors of R, G, and B, respectively, and a monochrome information reading sensor unit having a laser emitting diode (LED) light source that emits light to read monochrome information. According to this image forming apparatus, when reading color information of a document, only one side of the document is read, and when reading monochrome information of a document, both sides of the document are read by a one-time reading scan.

Japanese Published Unexamined Patent Application No. H11-331493 discloses another conventional image forming apparatus. This image forming apparatus is a both-sided color document reading device having a configuration in which color image sensors by a light-source sequential lighting method are arranged opposite each other and that is capable of simultaneously reading both sides of a document. This is realized by inputting, into an image processing device, color signals with three colors of one line of respective surfaces of the image sensor unit in sets while switching the same by turns for the front and rear, both surfaces of a document are simultaneously read.

Meanwhile, a color scanner output image data on three channels of RGB, whereas a monochrome scanner output image data on only one channel. In both of the conventional arts described above, an image processing is executed for the front page first (front image processing) and then executed for the rear page (rear image processing). In addition, because front and rear image effective image areas are different in the arranging position of a charge-coupled device (CCD) and a contact image sensor (CIS), image effective gate signals are differently inputted. Therefore, it is necessary for a color scanner and a monochrome duplex scanner to employ different circuit configurations between when reading color image information and when reading both surfaces in monochrome, and it is necessary to separately provide dedicated circuits when both scanners are used.

SUMMARY OF THE INVENTION

It is an object of the present invention to at least solve the problems in the conventional technology.

According to an aspect of the present invention, an image forming apparatus includes a color image reading device capable of scanning color documents to obtain color image data; a monochrome image reading device configured to simultaneously scan both surfaces, including a first surface and a second surface, of a document to obtain monochrome image data of the document; a first storage unit configured to store therein the monochrome image data to delay a timing of image formation based on the monochrome image data; an image processing unit that executes a predetermined image processing on both the color image data and the monochrome image data at one time by use of a path for processing the color image data to obtained processed image data, the color image data being color image data read by the color image reading device and the monochrome image data being monochrome image data stored in the first storage unit; and a second storage unit that stores therein the processed image data; and an image forming unit that forms an image based on the processed image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained with reference to the accompanying drawings.

Figure 1A:
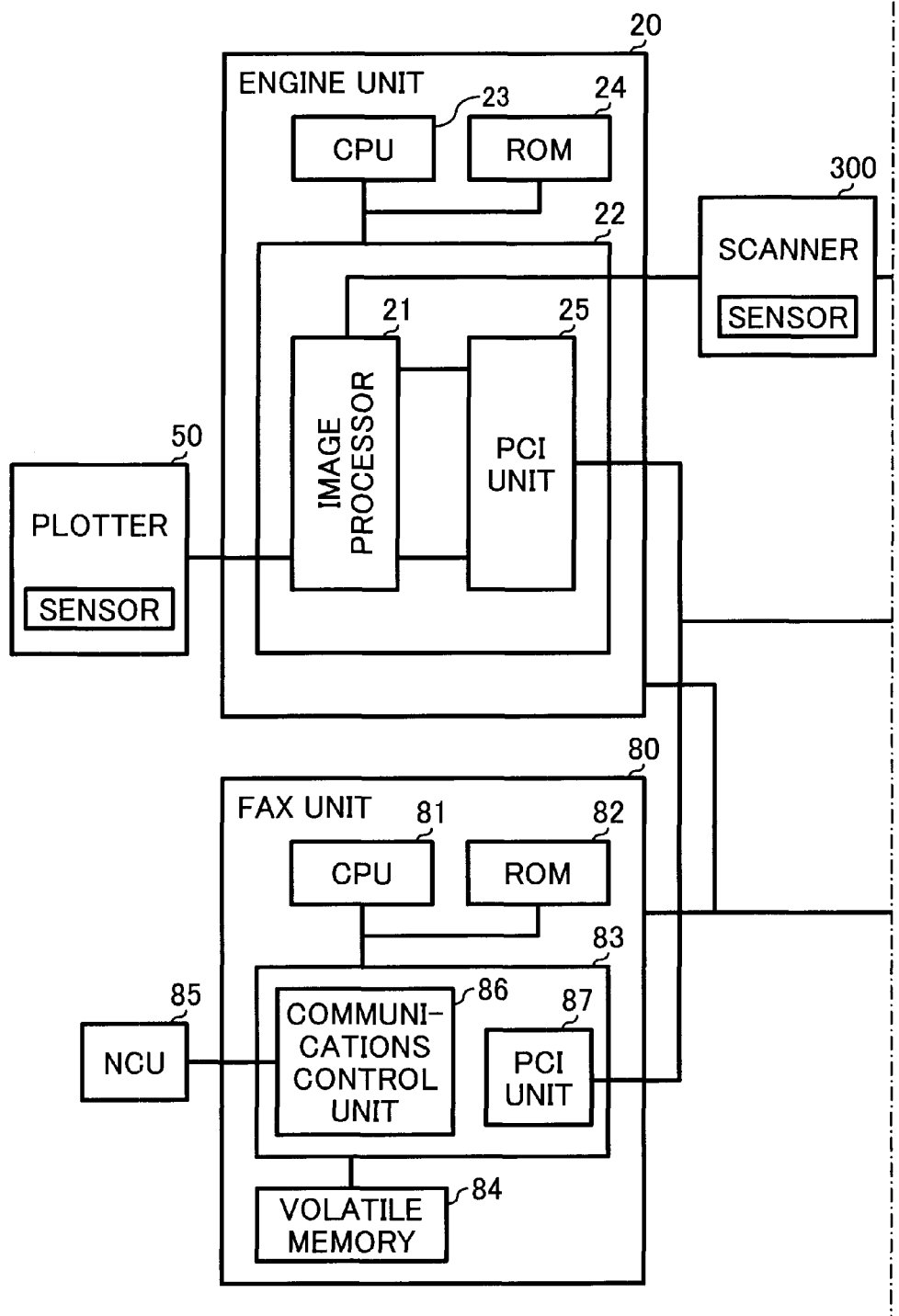
FIG. 1 is a functional block diagram of an image forming apparatus according to an embodiment of the present invention.
Figure 1B:
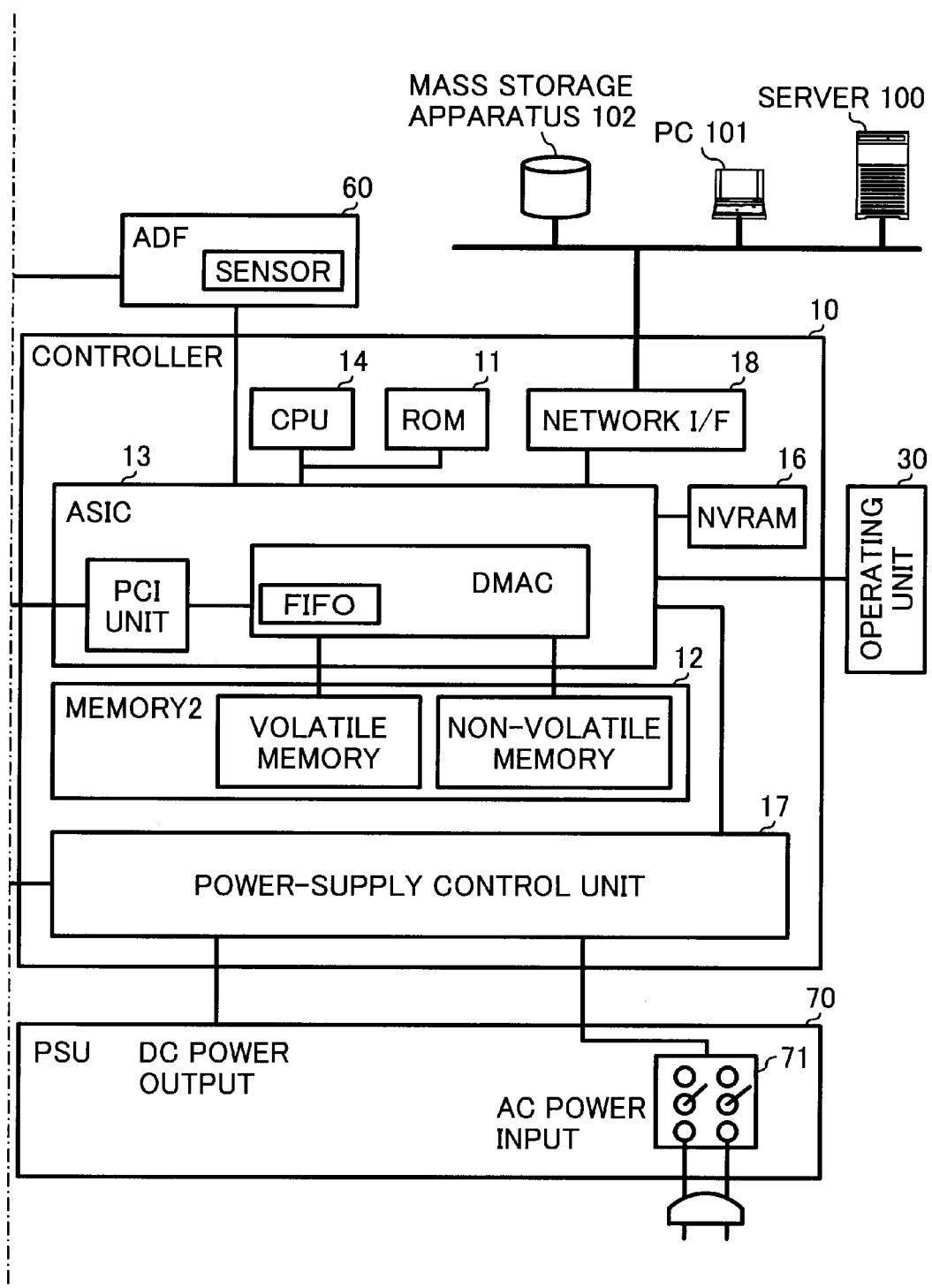
Figure 2:
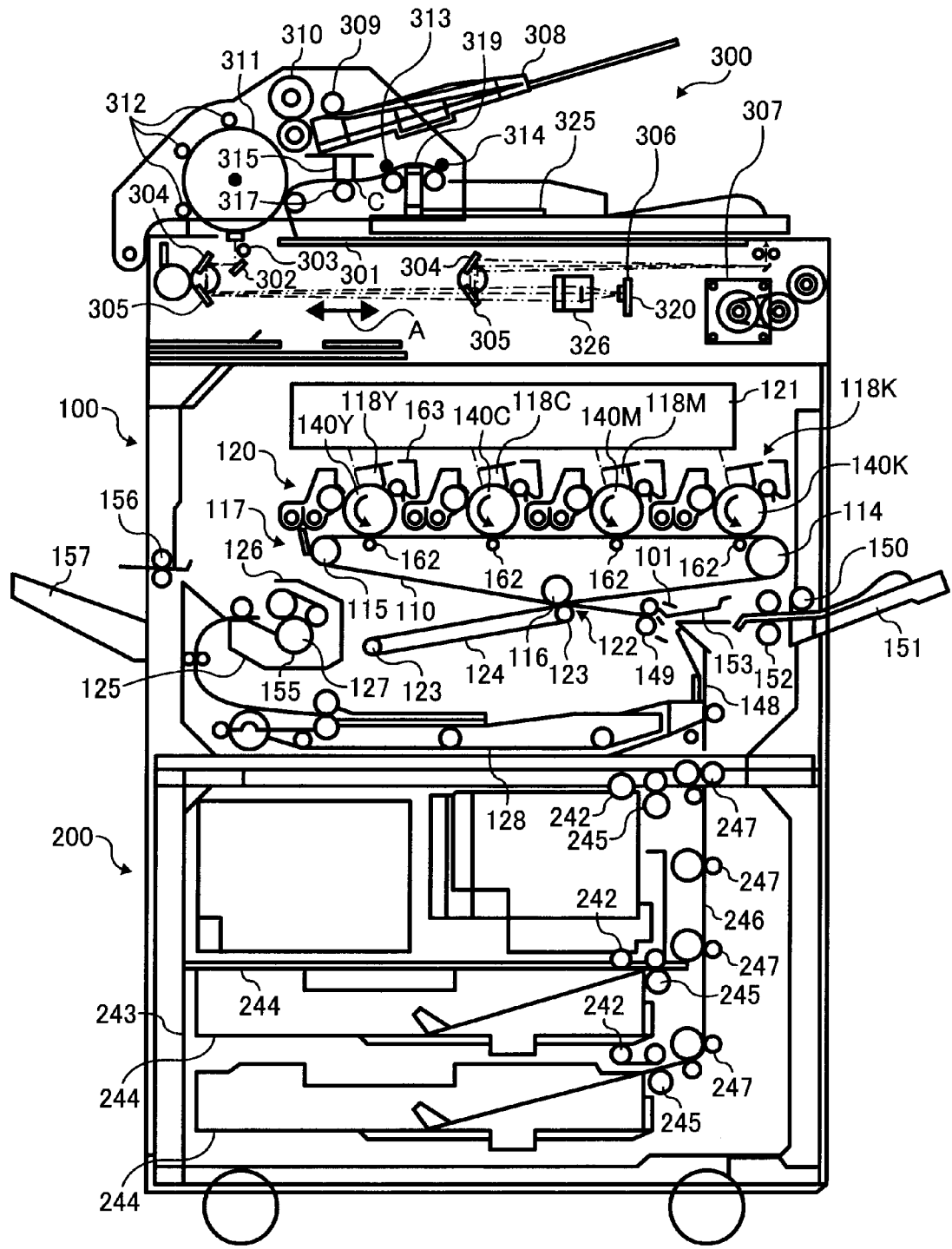
FIG. 2 is a schematic for explaining the internal configuration of the image forming apparatus shown in FIG. 1.

FIG. 1 is a functional block diagram of a digital multifunction product as an image forming apparatus according to an embodiment of the present invention, and FIG. 2 is a schematic for explaining an internal configuration thereof.

As shown in FIG. 2, the image forming apparatus includes an image forming apparatus (copying machine) body 100, a paper feed table 200 on which the image forming apparatus body 100 is mounted, and a document reading device (scanner) 300 including an automatic document feeder (ADF) attached on the image forming apparatus body 100.

An endless-belt-like intermediate transfer unit 110 is provided at substantially the center of the copying machine body 100. The intermediate transfer unit 110 includes a base layer made of, for example, a fluorine-containing resin that hardly stretches or a rubber material that stretch much along with a material which hardly stretches such as sailcloth, an elastic layer provided on the base layer, and a coat layer excellent in smoothness coated on the surface of the elastic layer. The elastic layer is made of, for example, a fluorine-containing rubber, or a butadiene-acrylonitrile copolymer rubber, and the coat layer is made of, for example, a fluorine-containing resin.

The intermediate transfer unit 110 is laid across first, second, and third support rollers 114, 115, and 116 as shown in FIG. 2, and is configured to rotate clockwise in FIG. 2. An intermediate transfer unit cleaning device 117 that removes a residual toner that remains on the intermediate transfer unit 110 after an image transfer is provided on the left of the second support roller 115 among the three support rollers.

Along a conveying direction of the intermediate transfer unit 110, four image forming means 118Y, 118C, 118M, and 118K for forming monochrome images in yellow (Y), cyan (C), magenta (M), and black (K) are arranged side by side to construct a tandem image forming unit 120. An exposure device 121 is provided above the tandem image forming unit 120. The alphabets suffixed to the reference numerals stand for colors. For example, Y means yellow, C means cyan, M means magenta, and K means black.

A secondary transfer device 122 is provided on the side opposite the tandem image forming unit 120 across the intermediate transfer unit 110. The secondary transfer device 122 includes a secondary transfer belt 124, which is an endless belt, laid on two rollers 123. The roller 123 on the right is pressed against the third support roller 116 so that the intermediate transfer body 110, a transfer paper, and the secondary transfer belt 124 are sandwiched between the two rollers. Because the intermediate transfer body 110 is pressed against the transfer paper due to the action of the two rollers 116 and 123, an image on the intermediate transfer unit 110 is transferred to the transfer paper.

A fixing device 125 that fixes the image transferred on the transfer paper to the transfer paper is provided at a downstream side in a transfer paper conveying direction of the secondary transfer device 122. The fixing device 125 includes a pressure roller 127 that is pressed against a fixing belt 126, which is an endless belt. The secondary transfer device 122 conveys the transfer paper with the image to the fixing device 125. As a matter of course, as the secondary transfer device 122, a transfer roller or a non-contact charger may be arranged, and in such a case, it becomes difficult to provide the transfer paper conveying function along therewith.

Below the secondary transfer device 122 and fixing device 125 as these, in parallel with the tandem image forming unit 120, a transfer paper reversing device 128 that reverses a transfer paper so as to record images on both sides of the transfer paper is provided.

When the scanner 300 simultaneously reads a both-sided document, the scanner 300 reads the same by a sheet-through method. Namely, first and second travelers read images while shifting in a sub-scanning direction in a case of a book document. In a case of simultaneous reading of both sides, the first traveler is positioned at a document reading position at an most upstream side in a document conveying direction of a contact glass 103, and in a stopped condition, the front surface of a document that passes above the contact glass 203 is read as shown in FIG. 2, while the rear surface is read by a contact image sensor (CIS) provided at a position slightly shifted to a downstream side in the document conveying direction from the document reading position. These operations are carried out in parallel according to a conveyance of the document. Hereinafter, the operations will be described in detail.

As shown in FIG. 2, a document placed on a document platen glass 301 is irradiated by an illuminating lamp 303 constructed integrally with a first mirror 302 (the first mirror 302 and illuminating lamp 303 are loaded on the first traveler), and a light reflected therefrom is caused to scan by an integrally constructed second mirror 304 and third mirror 305 (the second mirror 304 and third mirror 305 are loaded on the second traveler) from the first mirror 302. Thereafter, the reflected light is condensed by a lens 326 and is irradiated onto an image plane of a CCD 306 so as to be photoelectrically converted. The first traveler loaded with the first mirror 302 and illuminating lamp 303 and the second traveler loaded with the second mirror 304 and third mirror 305 are shiftable in an A direction by use of a traveler motor 307 as a drive source. A document loaded on a document tray 308 is sent, by a pickup roller 309, a pair of resist rollers 310, a conveyance drum 311, and a conveyance roller 312, into a pair of conveyance rollers 313 and a pair of paper discharge rollers 314 through a reading position B, and is discharged onto a paper discharge tray 325.

The document is irradiated, when passing through the reading position B, by the illuminating lamp 303 that has been shifted to the vicinity of the reading position B, and a light reflected therefrom is caused to scan by the first mirror 302 and the integrally constructed second mirror 304 and third mirror 305. Thereafter, the reflected light is converged by the lens 326 and is irradiated onto the CCD 306 so as to be photoelectrically converted. The pickup roller 309 and pair of resist rollers 310 are driven by a paper feed motor (not shown), and the conveyance drum 311, conveyance roller 312, pair of conveyance rollers 313, and pair of paper discharge rollers 314 are driven by a conveyance motor (not shown).

At a reading position C, a CIS 315 is installed. The CIS 315 includes an LED (not shown) as a light source, a lens, and a sensor element. The document is irradiated, when passing through a reading position C, on a surface (rear surface) opposite the surface read at the reading position B, by the lamp in the CIS 315 installed at the reading position C, and a light reflected therefrom is converged by the lens on the CIS 315 and is irradiated onto the sensor element on the CIS 315 so as to be photoelectrically converted. At an opposite portion across the document from the CIS 315, a white roller 317 is installed, and this is used as a white member for shading correction during reading by the CIS 315.

Now, when a copy is to be made by use of this color copying machine, a document is set on the document tray 308 of the scanner 300 or the ADF of the scanner 300 is opened, a document is set on the document platen glass (contact glass) 301 of the scanner 300, and the ADF is closed to hold down the document. Then, by pressing a start switch (not shown), the first and second travelers are traveled, when the document has been set on the document tray 308, after the document is conveyed and shifted onto the document platen glass 301, and when the document has been set on the document platen glass 301, these are immediately traveled. Then, a light is emitted by the illuminating lamp 303 and a light reflected from the document plane is reflected and directed to the second traveler by the first mirror 302, is reflected by the second and third mirrors 304 and 305 of the second traveler, and is irradiated onto a reading sensor (CCD) 320 through the imaging lens 326 so as to read the contents of the document.

In addition, when the start switch is pressed, a drive motor drives the first support roller 114 being a drive roller to rotate, whereby the other two second and third support rollers being follower rollers are rotated in a driven manner, and the intermediate transfer unit 110 is rotated for conveyance. Simultaneously, the individual image forming means 118 rotate photoconductor drums 140 thereof so as to form monochrome images in black, yellow, magenta, and cyan on the respective photoconductor drums 140, respectively. And, with the conveyance by the intermediate transfer unit 110, these monochrome images are transferred in sequence to form a composite color image on the intermediate transfer unit 110.

On the other hand, when the start switch is pressed, one of the paper feed rollers 242 of the paper feed table 200 is selectively rotated, a transfer paper is sent out from one of the paper feed cassettes 244 that are provided in multiple tiers within a paper bank 243, is inserted into a paper feed path 246 while being separated sheet by sheet by a separation roller 245, is lead to a paper feed path 148 in the copying machine body 100 by conveying the same by conveyance rollers 247, and is struck against the resist roller 149 so as to be stopped. Another paper feeding method may be employed so that a transfer paper on a manual feed tray 151 is sent out by rotating a paper feed roller 150, is inserted into a manual paper feed path 153 while being separated sheet by sheet by a separation roller 152, and is struck against the same resist roller 149 so as to be stopped.

Then, by rotating the resist roller 149 in timing with the composite color image on the intermediate transfer unit 110, the transfer paper is sent in between the intermediate transfer unit 110 and secondary transfer device 122, and the color image is recorded on the transfer paper by transferring the same by the secondary transfer device 122.

The transfer paper after an image transfer is sent into the fixing device 125 by the secondary transfer device 122, and after the transfer image is fixed by applying heat and pressure by the fixing device 125, the transfer paper is discharged by a discharge roller 156 by switching by a switching nail 155, and is stacked on a paper discharge tray 157. At this time, it is also possible to send the transfer paper into the transfer paper reversing device 128, reverse it there, lead it again to the transfer position, record an image on the rear surface as well, and then reject it on the paper discharge tray 157 by the discharge roller 156.

On the other hand, the intermediate transfer unit 110 after an image transfer prepares for another image formation by the tandem image forming unit 120 by removing a residual toner that remains on the intermediate transfer unit 110 after an image transfer by the intermediate transfer unit cleaning device 117. Although the resist roller 149 is generally often used in a grounded manner, it is also possible to apply a bias to remove transfer paper dust.

In the tandem image forming unit 120, each image forming means 118 is provided with a charging device, a developing device, a primary transfer device 162, a photoconductor cleaning device, a neutralization apparatus, and the like around the drum-like photoconductor 140.

As shown in FIG. 1, the copying machine body 100 includes a controller 10 that controls the entire apparatus, the scanner 300 that reads a document image on the contact glass 301 and converts the same to image data, a plotter 50 that forms an image on a recording paper through an electrophotographic process, an engine unit 20 that controls scanner units 1 and 2 and the plotter 50, an operating unit 30 having various switches and a display unit, an automatic document feeder (ADF) 60, a power-supply unit (PSU) 70 that supplies a direct-current power by inputting a power from an external AC power supply, and a facsimile (FAX) unit 80 that transmits and receives image data via a FAX network. The respective units of the controller 10, engine unit 20, and FAX unit 80 are interconnected by peripheral components interconnect (PCI) buses. As a matter of course, these may be connected by other local buses.

The engine unit 20 that controls the scanner units 1 and 2 and the plotter 50 is provided with an application specific integrated circuit (ASIC) 22 having an image processor 21 that carries out image processings such as Add-Compare-Select (ACS), filtering, error diffusion, and γ-conversion and a PCI unit 25 that transmits and receives data via a PCI bus, a central processing unit (CPU) 23 that controls the entire engine unit 20, and a read-only memory (ROM) 24 that stores programs executed by the CPU 23 and various types of control data. In addition, the image processor 21 is connected so as to be accessible to a first memory 35 (shown as a memory 1 in the drawing) provided outside the engine unit 20, with respect to which storing and readout of image data is carried out.

The FAX unit 80 is provided with a CPU 81 that controls the entire FAX unit 80, a ROM 82 that stores programs and various types of control data, an ASIC 83, a memory 84 that is used for accumulating image data received from a FAX network, and a network control unit (NCU) 85 that carries out network control. The ASIC 83 is provided with a communications control unit 86 that transmits and receives data with respect to a FAX network via the NCU 85 that carries out network control and a PCI unit 87 that transmits and receives data via a PCI bus.

The controller 10 controls the entire multifunction product and controls drawing, communications, and an input from the control unit 30, and through a network interface (I/F) unit, a server 100 and a PC terminal 101 are connected thereto via a local area network (LAN). The controller 10 is provided with a ROM 11 that stores programs and various types of control data, a second memory 12 (shown as a memory 2 in the drawing) for storing various types of data, an ASIC 13, a CPU 14, an NVRAM (non-volatile random access memory) 16 for storing control data including identifications (IDs), and a power-supply control unit 17 that controls power supply to respective units. The power-supply control unit 17 monitors the condition of an AC power switch 71 of the PSU 70 and stores a condition flag that shows a condition thereof in, for example, the NVRAM 16. The flag is monitored by the CPU 14. The AC power switch 71 can be operated by an operator, and the operator turns on/off the power by operating the switch 71.

Figure 3:
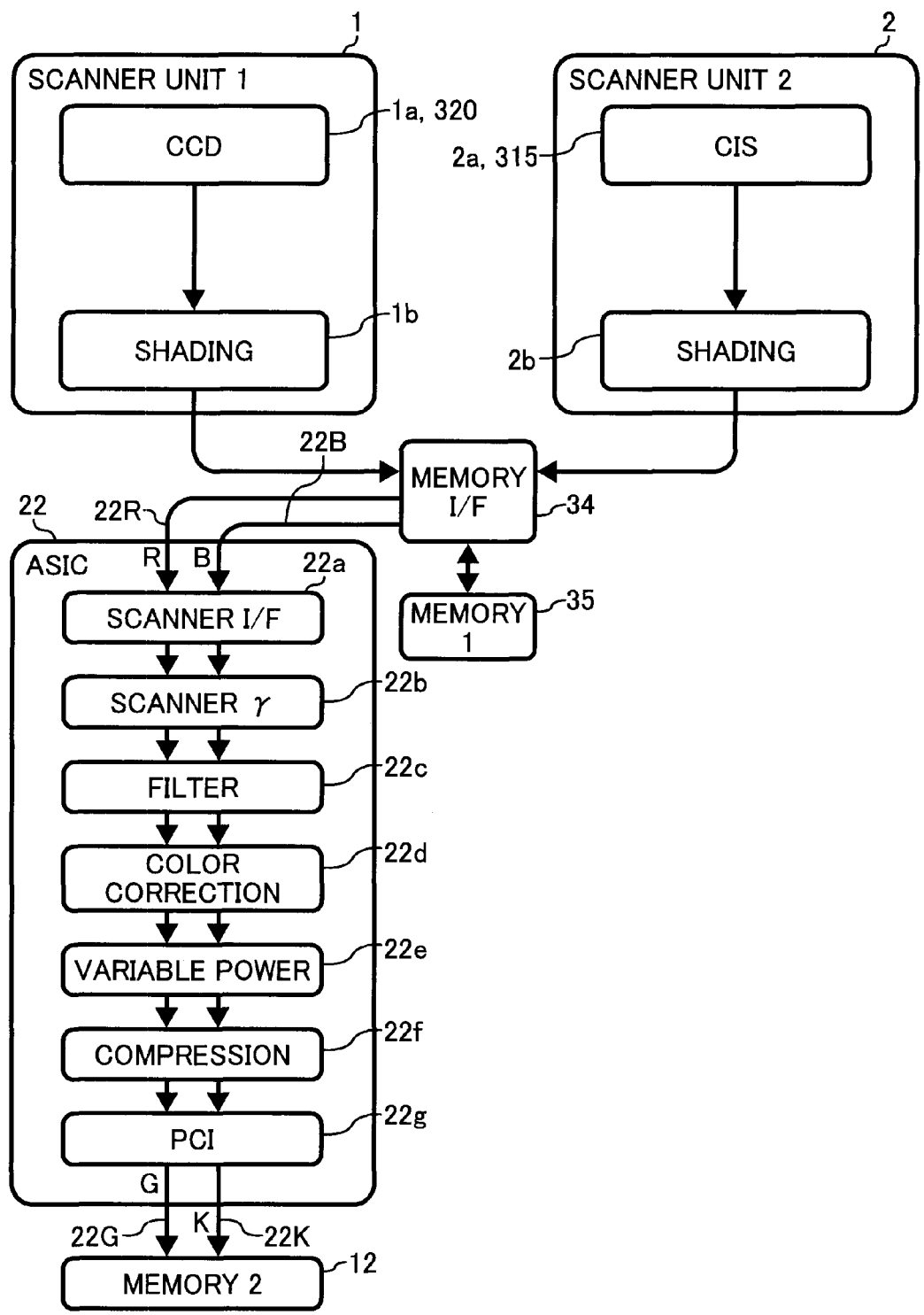
FIG. 3 is a chart of steps of processing image data read by a monochrome duplex scanner by using paths for a color scanner.

The scanner 300 includes a scanner unit 1 provided with a CCD 320 (numerical symbol 1a in FIG. 3) and a scanner unit 2 provided with the CIS 315 (numerical symbol 2a in FIG. 3).

Figure 4:
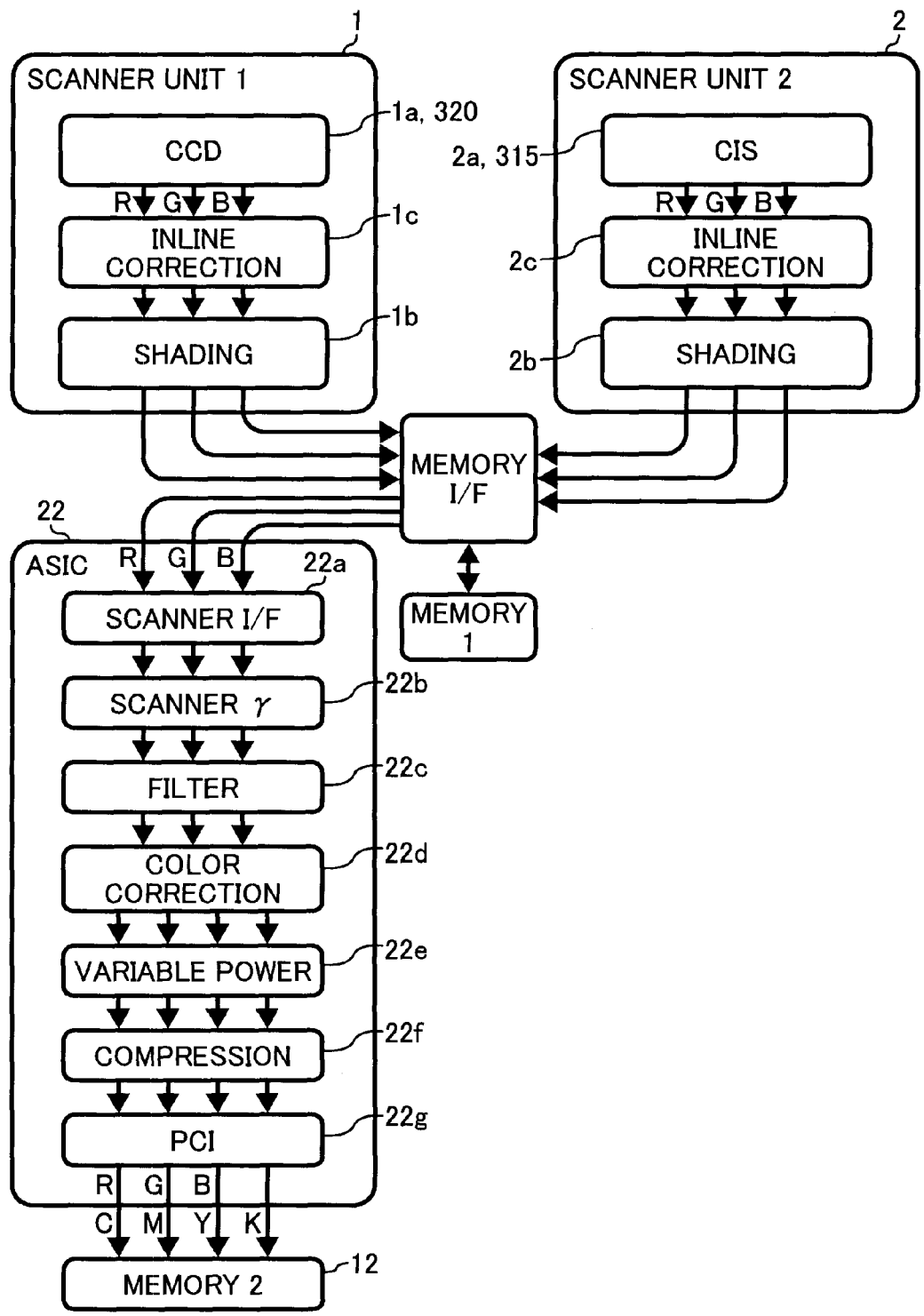
FIG. 4 is a chart of steps of processing image data by using a single color path when a both-sided document has been read by using a color duplex scanner.
Figure 5:
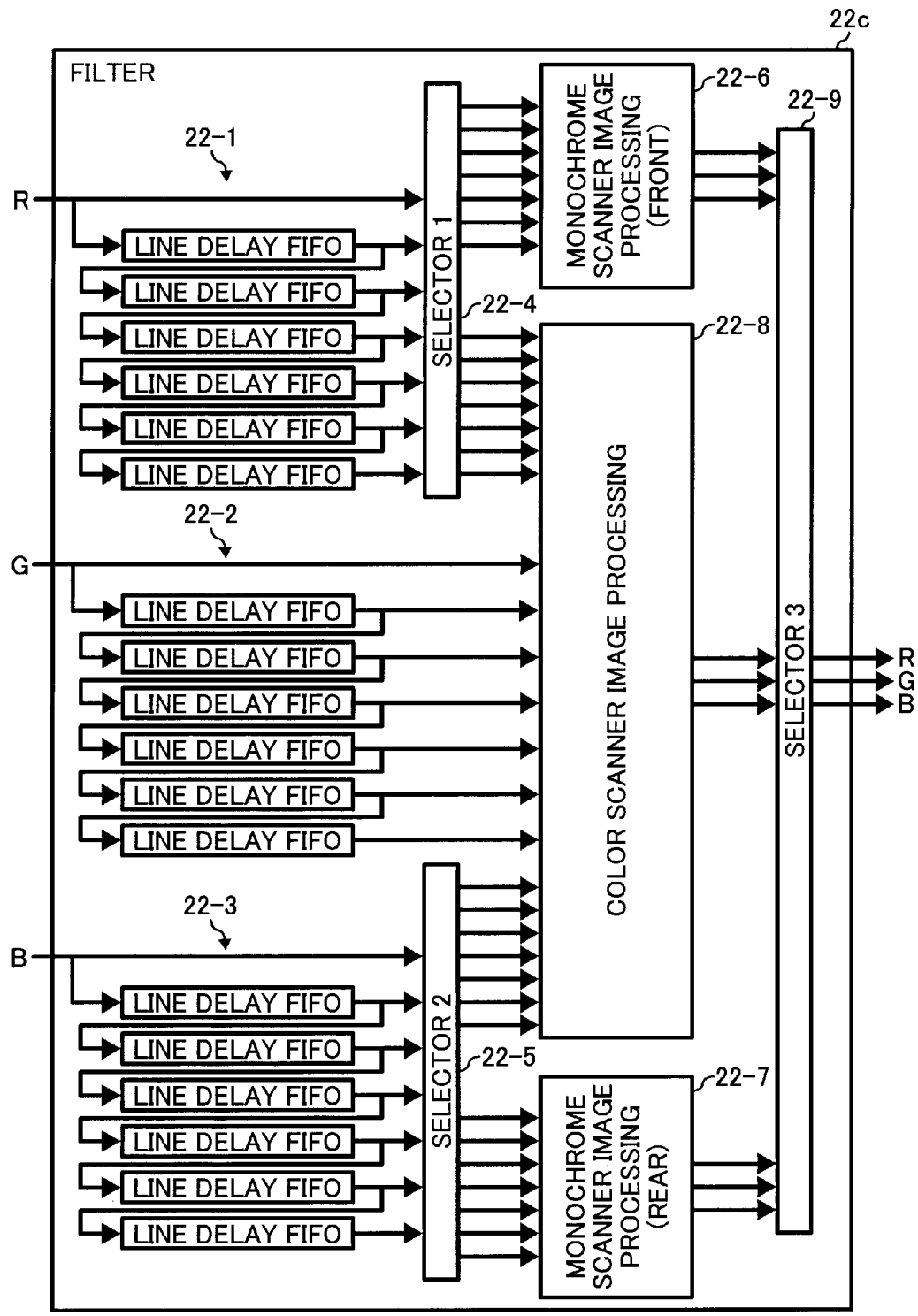
FIG. 5 is a block diagram of details of an ASIC filter shown in FIG. 3 and FIG. 4.

FIG. 3 to FIG. 5 depict flows and paths until read image data is once transferred from the scanner units 1 and 2 to the first memory 35 simultaneously with respect to the front and rear surfaces and the image data is accumulated in the second memory 12 after various image processings are executed by the ASIC 22 are shown according to configurations.

FIG. 3 is a chart of a usage example of paths when a monochrome document is read. In this example, out of three color channels, to an R (red) channel and a B (blue) channel, image data is transferred from the first memory 35 at an identical timing, and the image data of the front-surface side and image data of the rear-surface side are written in the second memory 12 by using a G (green) channel and a K (black) channel. Namely, the first scanner unit 1 reads the front surface of the document, the second scanner unit 2 simultaneously reads the rear surface of the document, the read image data is once stored in the first memory 35 while adjusting writing timings of the front and rear data by a memory I/F 34 (at a set delay timing), and then the image data is transferred to the ASIC 22. Although the memory I/F 34 is illustrated outside the ASIC 22, memory I/F control may be carried out inside the ASIC 22. The reason that the read image data is once accumulated in the first memory 35 is because simultaneous reading of both surfaces results in a large mechanical configuration. Moreover, a program for a document size detecting function can be stored in a memory such as a ROM, so as to determine a document size based on image data of the front and rear of a document once accumulated in the memory 35. Furthermore, gate control of image processing paths can be carried out as identical control by integrating timings of gate signals in various effective regions of both front and rear surfaces of a document, so that any two channels of the RGB used in a color scanner can be used when the front and rear surfaces of a monochrome document are scanned. Employment of both configurations allows determining a size of a read document and outputting image data while integrating the timings for the front and rear of the document when accumulating or outputting image data of the read document if the first memory 35 has a capacity not less than a size equivalent to a size of image data of two front and rear pages of a document. In addition, the document size detected by the program for a document size detecting function can also be utilized for a variable power processing by a variable power unit 22e.

The first scanner unit 1 includes the first and second travelers, imaging lens, CCD 1a (320) being a photoelectric converter, and a shading correction unit 1b provided on the lower surface of the document platen glass 301, and image data read by the CCD 1a receives a shading correction in the shading correction unit 1b and is once stored in the first memory 35 through the memory I/F 34. In addition, the second scanner unit 2 is provided with the CIS 2a (315) and a shading correction unit 2b, and a read image obtained by reading the rear surface of the document is also once stored in the first memory 35 through the memory I/F 34.

The image data is read out of the first memory 35 and is inputted into the R channel and B channel at an identical timing. The R channel and B channel are R and B channels of color paths, and for example, image data of the front surface of a document read by the first scanner 1 is inputted into the R channel, and image data of the rear surface of the document read by the second scanner unit 2, into the B channel.

The ASIC 22 is provided with a scanner I/F 22a, a scanner gamma correction unit 22b, a filter 22c, a color correction unit 22d, the variable power unit 22e, a compression unit 22f, and a PCI 22g. Therefore, read image data inputted through the scanner I/F 22a is converted to monochrome gray-scale data due to a γ-correction carried out by the scanner gamma unit 22b and, furthermore, a predetermined filter processing carried out by the filter 22c. Then, the image data passes through the color correction unit 22d, receives a variable power processing by the variable power unit 22e if there is a necessity for enlargement or reduction, and is compressed by the compression unit 22f, whereby monochrome data of the front and rear surfaces of the document is stored in parallel in the second memory 12 through the PCI bus.

FIG. 4 is a chart of a usage example of paths when a color document is read. In the example, image data of the front and rear of a document obtained by simultaneously reading both surfaces is once accumulated in the first memory 35 through the memory I/F 34, and the accumulated image data is written in the second memory 12 by transferring the same in sequence through the memory I/F 34 to the ASIC 22 by using three paths provided for the respective colors.

Namely, an image on the front side of the document is read by the CCD 1a (320) of the first scanner unit 1, and after an inline correction is carried out by an inline correction unit 1c and a shading correction is carried out for the respective RGB colors in the shading unit 1b, the image data is inputted into the first memory 35 through the memory interface I/F 34. An image on the rear side of the document is read by the CIS 2a (315) of the second scanner unit 2, and after an inline correction is carried out by an inline correction unit 2c and a shading correction is carried out for the respective RGB colors in the shading unit 2b, the image data is inputted into the first memory 35 through the memory I/F 34, so that the image data of both surfaces are accumulated in the first memory 35. Then, the image information on the front and rear surfaces is read out with respect to each line (line sequence) or each surface (page sequence), and the RGB image data are transferred to the ASIC 22 via the respective RGB channels.

The ASIC 22 is the one shown in FIG. 3, and after predetermined processings are applied in the respective units of the scanner I/F 22a, scanner gamma correction unit 22b, filter 22c, color correction unit 22d, variable power unit 22e, and compression unit 22f, CMYK image data converted from RGB is transferred from the PCI 22g to the second memory 12 and is stored in the second memory 12.

FIG. 5 is a detailed block diagram of the filter 22c of the ASIC 22. In the embodiment, a configuration when first to third 6-line delay first-in first-out (FIFOs) 22-1, 22-2, and 22-3 are used to carry out a 7×N (N: arbitrary positive integer) matrix operation is shown. At a rear part of the first 6-line delay FIFO 22-1 corresponding to the R channel, a first selector 22-4 (shown as a selector 1 in the drawing) is provided, and at a rear part of the third 6-line delay FIFO 22-3 corresponding to the B channel, a second selector 22-5 (shown as a selector 2 in the drawing) is provided. Because the G channel is not used as a monochrome image path, no selector is provided at a later part of the second 6-line delay FIFO 22-2.

At a rear part of the first selector 22-4, a first monochrome scanner image processor 22-6 that processes a monochrome image on the front side is provided, and at a rear part of the second selector 22-5, a second monochrome scanner image processor 22-7 that processes a monochrome image on the rear side is provided. Furthermore, a color scanner image processor 22-8 into which image data from the first or third 6-line delay FIFO 22-1 or 22-3 selected by the first or second selector 22-4 or 22-5 and image data from the second 6-line delay FIFO 22-2 corresponding to the G channel are inputted is provided, and by a third selector 22-9 (shown as a selector 3 in the drawing) provided at a rear part of the color scanner image processor 22-8, image data in RGB channels of either the first and second monochrome scanner image processors 22-6 and 22-7 or color scanner image processor 22-8 is selected.

At that time, in a case of monochrome image data, image data of the front side of a document is transferred to the R channel, and to the B channel, image data of the rear side of the document is transferred in parallel at an identical timing, furthermore, the image data are processed in the first and second monochrome scanner image processors 22-6 and 22-7 in parallel, and the image data of the front side and the image data of the rear side are outputted in parallel by the third selector from the R channel and B channel, respectively.

In a case of a color image data, RGB image data are transferred from the respective RGB channels to the filter 22, and in the R channel, image data selected by the first selector 22-4 is inputted from the first 6-line delay FIFO 22-1 into the color scanner image processor 22-8, in the G channel, image data delayed by the second 6-line delay FIFO 22-2 is inputted into the color scanner image processor 22-8, and in the B channel, image data selected by the second selector 22-5 from the third 6-line delay FIFO 22-3 is inputted into the color scanner image processor 22-8. Then, the RGB image data processed by the color scanner image processor 22-8 is selected by the third selector 22-9 and is outputted into the color correction unit 22d. In the color correction unit 22d, the RGB image data is converted to YMCK image data and is outputted to a rear part, and the image data is transferred from the PCI bus 22g to the second memory 12.

As such, because a monochrome image is inputted into the filter 22c at an identical timing with respect to the front and rear, it becomes possible to use an effective control signal of image data in common when using color scanner image paths in the front and rear monochrome scanner as well. Namely, in either the monochrome image or color image, the effective control signal of image data can be used at the same timing.

In addition, because the common line FIFOs are used between the monochrome scanner and color scanner, it becomes possible to reduce memory. Furthermore, because the monochrome scanner and color scanner are never simultaneously used, by providing a part used only by the color scanner, for example, the color scanner image processor 22-8, as a fixed value output when the multifunction product is used as a monochrome scanner, power consumption can be reduced. In contrast thereto, when it is used as a color scanner, by providing the first and second monochrome scanner image processors 22-6 and 22-7 as fixed value outputs, power consumption can be reduced. Also, because a G input is unnecessary when a monochrome scanner for simultaneous reading of both surfaces is connected, masking may be provided so as not to operate the line delay FIFOs by a gate signal or the like.

Figure 6:
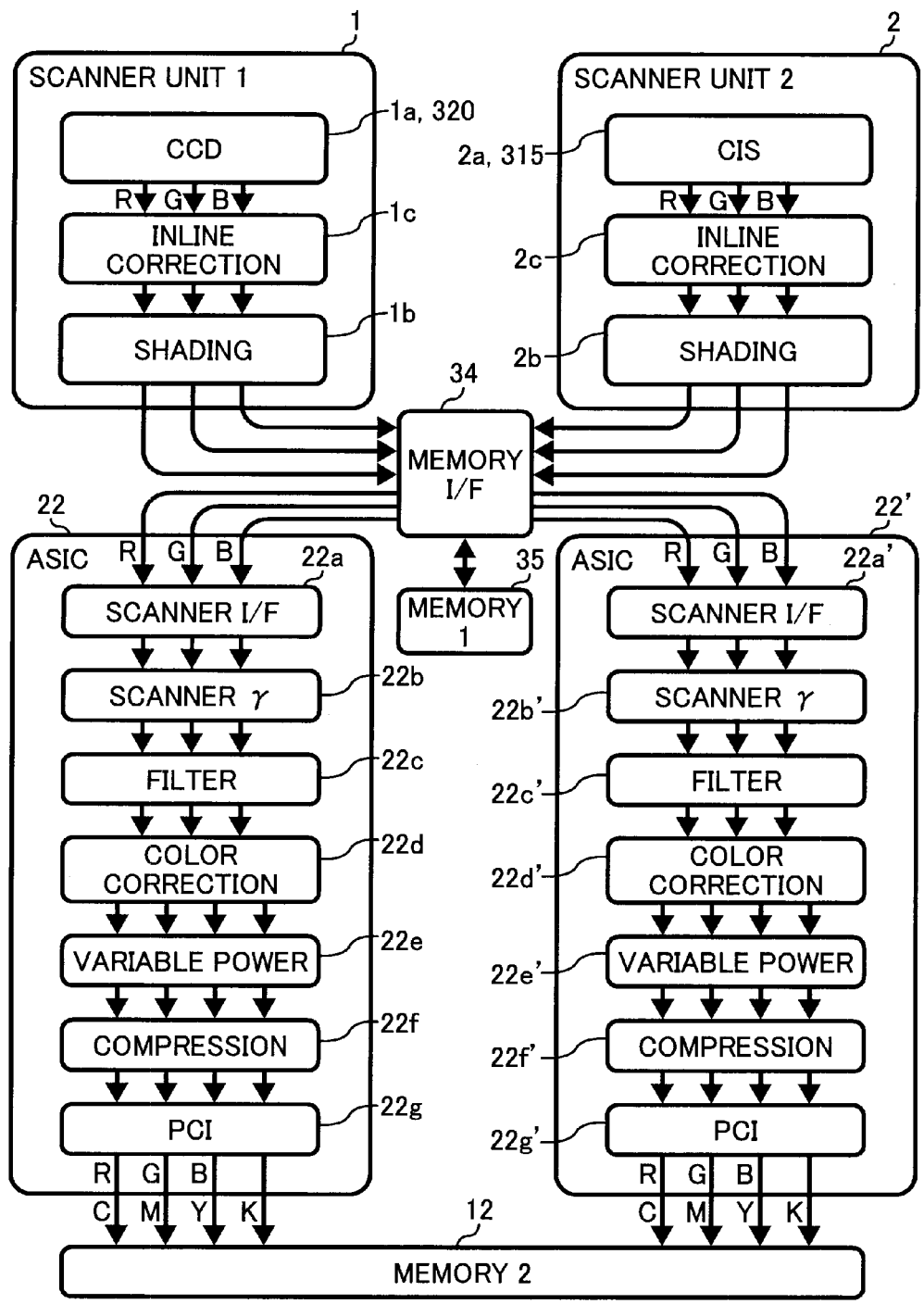
FIG. 6 is a chart of steps of processing image data by using two color paths when a both-sided document has been read by using a color duplex scanner.

In addition, if it is possible to increase a transfer to the second memory 12 in specifications, by providing an ASIC 22' that is the same as the ASIC 22 shown in FIG. 4 in parallel as shown in FIG. 6, a construction can be carried out so that a transfer of image data of the front side and rear side is simultaneously carried out. Thereby, processing efficiency doubles because a simultaneous processing for the front and rear is possible, thus a further efficient processing can be carried out. Accordingly, an image forming apparatus provided with a common memory I/F that allows an image processing according to a processing speed of memory accumulation can be obtained. For components the same as those of the ASIC 22, dashes are used.

As described above, the present embodiment gives following effects:

1) Because the image is inputted at an identical timing with respect to the front and rear, an effective control signal of image data can be used in common when using color scanner image paths in the front and rear monochrome scanner as well.

2) Because it is possible to use the common line FIFOs by a monochrome scanner and a color scanner, memory can be reduced, and power consumption can be reduced by providing a part that is not used as a fixed value output.

3) Performance can be improved by changing the implementation configuration of the image processing ASIC according to a processing speed of accumulation into the memory.

According to the present invention, an image processing is carried out by use of identical paths between color and monochrome scanners by adjusting the writing delay timings of the front and rear of a document and causing to execute image processings at a common timing, and an image formation can be carried out based on image data that has received the image processings.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a color image reading device capable of scanning color documents to obtain color image data;
   a monochrome image reading device configured to simultaneously scan both surfaces, including a first surface and a second surface, of a document to obtain monochrome image data of the document;
   a first storage unit configured to store therein the monochrome image data to delay a timing of image formation based on the monochrome image data;
   an image processing unit that executes a predetermined image processing on both the color image data and the monochrome image data at one time by use of a path for processing the color image data to obtain processed image data, the color image data being color image data read by the color image reading device and the monochrome image data being monochrome image data stored in the first storage unit; and
   a second storage unit that stores therein the processed image data; and
   an image forming unit that forms an image based on the processed image data,
   wherein the image processing unit includes:
      a monochrome processing unit that carries out the predetermined image processing on the monochrome image data by use of common line delay FIFOs provided on paths for the monochrome data and the color image data; and
      a color processing unit that carries out the predetermined image processing on the color image data,
   the image forming apparatus further comprising a selecting unit that selects any one of the monochrome processing unit and the color processing unit,
   wherein the color image reading device includes:
      an automatic document feeder that allows simultaneous scanning of the both surfaces of the document; and
      a plurality of color processing units, wherein a color processing unit is selected based on processing speed of the second storage unit.

2. The image forming apparatus according to claim 1, wherein:
   one of the monochrome processing unit and the color processing unit that is not selected by the selecting unit is provided as a fixed value output.

3. The image forming apparatus according to claim 1, wherein paths for two colors out of three colors of RGB are set as paths for sending image information of respective surfaces of document read by the monochrome image reading device.

4. The image forming apparatus according to claim 3, wherein
the sent image information is respectively once stored in the second storage unit by use of a path with a color other than the two colors of the RGB respective colors and a path for black.

5. The image forming apparatus according to claim 1, wherein each color processing unit includes one ASIC.

* * * * *